United States Patent Office 3,377,288
Patented Apr. 9, 1968

3,377,288
HYDRAULIC PRESSURE TRANSMISSION FLUID
Arthur W. Sawyer, Hamden, Conn., assignor to Olin Mathieson Chemical Corporation, a corporation of Virginia
No Drawing. Filed Nov. 5, 1964, Ser. No. 409,317
13 Claims. (Cl. 252—75)

This invention relates to new and improved hydraulic pressure transmission fluids for use in fluid pressure operating devices such as hydraulic brake systems, hydraulic steering mechanisms, hydraulic transmissions, etc.

It is a basic object of this invention to provide a hydraulic pressure transmission fluid for use in hydraulic systems which have a high degree of lubricity while maintaining desired viscosities within a predetermined range under wide variations of temperature conditions.

A wide variety of hydraulic fluid compositions have been suggested in the art. Commonly, the hydraulic pressure transmission fluids, such as brake fluids are made up of three principal units. The first is a base or lubricant for the system which may include heavy bodied fluids such as polyglycols, castor oil, mixtures of these materials, etc. Diluents, which are employed for the purpose of controlling the viscosity of the fluid as represented by glycol ethers, glycols, alcohols, etc., form the second basic unit. Finally, the third basic unit is represented by an inhibitor system comprising small quantities of inhibitors which are added to reduce oxidation, to improve wetting and flow and to maintain the pH of the hydraulic system above 7 in order to minimize corrosion. Although the hydraulic fluids of the prior art possesses one or more of the desired characteristics of viscosity temperature relationship, volatility, or pour-point, they all suffer from one or more disadvantages and their use is handicapped by the fact that a wide range of suitable properties cannot be obtained. Fluids known in the art suffer from lack of lubricity, some are not stable against oxidation or deterioration, with others it is found over long periods of use insoluble materials are formed which greatly reduce their efficiency and in some instances exposure to oxidizing conditions also results in the formation of insoluble compositions. Frequently, it is found that these fluids are also corrosive and that they do not possess the required rubber swelling properties.

It has been discovered that the hydraulic fluids of this invention, which contain as a base or a lubricant for the system, a polyoxy-alkylene adduct of a phenol are of low cost, they possess a high boiling point, they are odorless, colorless and have a high degree of water tolerance, they possess a high degree of compatibility with other fluids and exhibit a very low rate of corrosivity.

Another feature of this invention is the highly satisfactory rubber swelling performance of the novel fluids as shown in tests carried out according to SAE Standard J-70-B. Fluids previously employed have utilized expensive materials such as 2-ethylhexanol, heptanols, butyl ethers of glycols, or diethers of glycols in an amount from about 10 to about 30 percent by weight of the total composition to achieve the desired rubber swelling characteristics. The rubber swelling properties of the fluids of this invention are derived from the lubricant or base portion. The importance of the rubber swelling properties of the fluid cannot be overlooked since too little swelling will result in leakage of the fluid past the rubber cup sealing means and past the piston in hydraulic cylinders with corresponding loss of power. On the other hand fluids which cause too much rubber swelling are not desirable in that they destroy the structural properties of the rubber sealing cups in hydraulic cylinders, in turn, results in malfunction or inoperativeness of the unit.

Lubricant or base compositions

The polyoxyalkylene adduct of a suitable phenol which comprises the base or lubricant position of the novel composition of this invention will form from about 20 to about 50 percent by weight of the hydraulic fluid composition. The polyoxyalkylene adducts of this invention are formed by condensing aromatic compounds having at least one hydroxyl group with an alkylene oxide. A preferred type of adduct is that formed from an alkyl phenol. The alkylene oxides which can be used in preparing the polyoxyalkylene adducts of the starting phenols include ethylene oxide, propylene oxide and butylene oxide.

In preparing the polyoxyalkylene adducts (i.e. addition products) of the starting phenols, which form the lubricant or base fluid of the novel compositions of this invention, the alkylene oxide or a mixture of alkylene oxides are brought into intimate contact with the starting phenol in a liquid phase, throughout which an alkaline catalyst such as potassium hydroxide or sodium hydroxide is uniformly dispersed. The quantity of catalyst employed generally will be from about 0.15 to about 1.0 percent by weight of the reactants. The reaction temperature preferably will range from about 80° C. to about 180° C. while the reaction time will be from about 1 to 20 hours or more depending upon the particular reaction conditions employed. The process by which such adducts can be prepared is well known in the art and is more completely described in U.S. Patent 2,425,845.

The useful lubricant or base compositions of this invention include compounds of the formula:

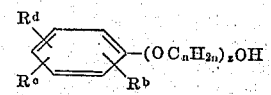

wherein $n$ is an integer of from 2 to 4 inclusive, $z$ is an integer of from 1 to 25 and with the proviso that when $n$ is 2 that $z$ is 1 to 5 inclusive, $R^b$ is selected from the group consisting of hydrogen and alkyl of from 1 to 20 carbon atoms, $R^c$ is selected from the group consisting of hydrogen, alkyl of from 1 to 20 carbon atoms, and $-(OC_nH_{2n})_zOH$, wherein $n$ and $z$ have the same meaning as previously described, and $R^d$ is selected from the group consisting of hydrogen and $-(OC_nH_{2n})_zOH$, wherein $n$ and $z$ have the same meaning as previously described.

Compounds of the above type (Formula A) in which the oxyalkylene chains prepared from a single alkylene oxide are replaced by heteric oxyalkylene chains formed by condensing simultaneously a mixture of ethylene oxide and propylene oxide or butylene oxide with a suitable reactive hydrogen compound or initiator, such as nonyl phenol, are also suitable base or lubricant compositions of this invention. In such a heteric oxyalkylene chain the different oxyalkylene units or groups are distributed randomly throughout the entire chain and the chain is terminated by a free hydroxyl group. The heteric chains of the adducts useful in this invention contain not more than a total of 40 oxyalkylene units and, in addition, the weight percent of oxyethylene units in the chain will be from about 5 to about 65, based on the total weight of all the oxyalkylene units present in the chain.

The reaction which takes place in forming the base or lubricant compounds having heteric chains is shown in the following equation where for purposes of illustration the reaction with ethylene oxide, propylene oxide and nonyl phenol is shown:

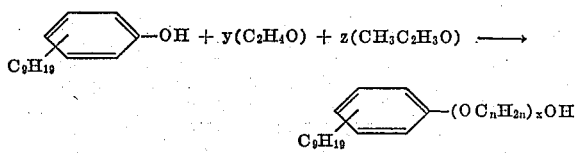

wherein $y$ and $z$ represent the number of moles of ethylene oxide and propylene oxide respectively; $n$ is both 2 and 3 in a single molecule, the total number of times $n$ has a value of 2 being equal to $y$ and the total number of times $n$ has a value of 3 being equal to $z$ and $x$ is the total number of oxyalkylene groups, being equal to $y+z$ and being not more than 40. Further, the value of $y$ is selected so that the weight percent of oxyethylene units based on the total weight of all the oxyalkylene units present in the entire chain is from about 5 to about 65.

Compounds of the following formula are also useful as lubricants or base compositions in the novel fluids of this invention:

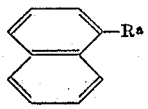

wherein $R^a$ is selected from the group consisting of (a) $(OC_nH_{2n})_zOH$ in which $n$ is an integer of from 2 to 4 inclusive, $z$ is an integer of from 1 to 25 and with the proviso that when $n$ is 2 that $z$ is 1 to 5 inclusive and (b) a heteric polymeric chain of oxyethylene units and oxyalkylene units derived from an alkylene oxide of the group consisting of propylene oxide and butylene oxide, the said chain being terminated by a free hydroxyl group, wherein the said chain contains a total of not more than 40 oxyalkylene units and wherein in the said chain the weight percent of oxyethylene units based on the total weight of all the oxyalkylene units in the entire chain is from about 5 to about 65.

A preferred initiator or starting phenol for use in preparing the novel oxyalkylene adducts of this invention is nonyl phenol. Commercial nonyl phenol is comprised of a mixture of isomeric monoalkyl phenols which are predominantly para substituted which contains about 3–5 percent dinonyl phenol and less than 1 percent of the ortho derivative. The side chains of commercial nonyl phenols are a mixture of branched-chain isomers. A typical nonyl phenol starting material has a distillation range at 760 mm. Hg of 298–325° C. (90 percent of the material is distilled within the foregoing range); the specific gravity at 25° C. is 0.945; the hydroxyl number 245; the refractive index 1.508 and the viscosity range at 100° F. is 265–305 centipoises.

Octyl phenol is a preferred alternative phenol. As indicated by infra-red and other analytical evidence, commercially available octyl phenol contains approximately 85–90 percent of the monoderivative, 1,1,3,3-tetramethylbutylphenol, of which about 98 percent is the para isomer, the balance being ortho. The dioctyl phenol content is about 5–10 percent.

Useful phenols which can be reacted with an alkylene oxide or a mixture of alkylene oxides to form the valuable base or lubricant compositions of this invention include amyl phenol, diamyl phenol, heptyl phenol, octyl phenol, nonyl phenol, dinonyl phenol, dodecyl phenol, hexadecyl phenol, octadecyl phenol, cresol, methyl cresol, butyl cresol, hexyl cresol, octadecyl cresol, resorcinol, ethyl resorcinol, diethyl resorcinol, heptyl resorcinol, dodecyl resorcinol, hydroguinone, catechol, butyl catechol, toluhydroquinone, pyrogallol, alpha naphthol, beta naphthol and isomers thereof.

Diluents

The diluent portion of the novel fluid compositions of this invention can constitute from about 50 to about 80 percent by weight of the fluid. One or more glycols and glycol alcohol ethers comprise the diluent portion of the fluid compositions. Representative of the glycols which can be used as diluents are the alkylene glycols of the formula:

$$HO(R^eO)_pH$$

where $R^e$ is alkylene of from 2 to 3 inclusive carbon atoms, and $p$ is an integer of from 1 to 3 inclusive. Useful glycols of this type include ethylene glycol, propylene glycol, diethylene glycol, dipropylene glycol, triethylene glycol, etc. Examples of glycol alcohol ethers useful as diluents include ethylene glycol monomethyl ether, diethylene glycol monomethyl ether, triethylene glycol monomethyl ether, propylene glycol monoethyl ether, dipropylene glycol monomethyl ether, tripropylene glycol monomethyl ether, diethylene glycol monoethyl ether, diethylene glycol monobutyl ether, dipropylene glycol monoethyl ether, diethylene glycol monoisopropyl ether, triethylene glycol monopropyl ether, tetrapropylene glycol monobutyl ether, etc. The glycol alcohol ethers employed in the fluids of this invention have the formula:

$$R^fO(R^gO)_mH$$

wherein $R^f$ is alkyl of from 1 to 6 carbon atoms, $R^g$ is alkylene of from 2 to 3 inclusive carbon atoms and $m$ is an integer of from 1 to 4 inclusive.

Additives

When desired, alkaline inhibitors for pH and corrosion control can be employed in an amount sufficient to maintain alkaline conditions in the fluid compositions, e.g., a pH value of from about 7.0 to about 11.5. These alkaline inhibitors are generally added in an amount of from about 0.01 to about 1.5 percent by weight based on the total weight of the fluid composition. Useful alkaline inhibitors include alkali metal borates, such as sodium borate, potassium tetraborate, etc., alkali metal salts of higher fatty acids such as potassium oleate, the potassium soap of rosin or tall oil fatty acids; amines, such as morpholine, phenyl morpholine, ethanolamine, triethanolamine, etc.; amine salts, such as mono or dibutyl ammonium borates, dibutyl amine phosphates, lower alkylene glycol condensates with alkali metal borates such as the ethylene glycol condensate of potassium tetraborate, etc.

Preferably, the fluid compositions of this invention contain from about 0.001 to about 1.5 percent by weight of an antioxidant based on the total weight of the fluid compositions, to protect the diluents. Typical antioxidants include compounds, such as 2,2-di-(4-hydroxyphenyl) propane, phenothiazine and polymerized trimethyldihydroquinoline and the like, amines such as phenyl-alpha-naphthylamine, phenyl-beta-naphthylamine, dioctyl diphenylamine, etc., hindered phenols such as dibutyl cresol, butylated 2,2-di-(4-hydroxyphenyl) propane, n-butylated aminophenol and butylated hydroxyanisole. It should be emphasized that with a variety of the fluids of this invention, which are suitable for a wide range of industrial applications, a separate antioxidant is not required.

If desired, butynediol in an amount of from about 0.1 to about 1.00 percent by weight, based on the total weight of the fluid composition, can be added to inhibit corrosion. Preferably, the novel fluid compositions of this invention will contain from about 0.1 to about 3.0 percent by weight, based on the total weight of the fluid composition, of dodecyl benzene or tridecyl benzene which function as rubber swelling adjusters. Likewise, minor amounts of water, that is, from about 0.1 to 2 weight percent based on the total weight of the fluid composition, can be added to adjust certain properties, such as the boiling point.

Formulation of the novel fluid of this invention is accomplished by blending the components to a homogeneous stage in a mixing vessel. The preferable blending temperature is from 50–125° F. It is preferable to warm the solution during preparation to facilitate dissolution. The blending of the compounds takes place at atmospheric pressure.

In general, any suitable method can be used in preparing the liquid compositions of this invention. The components can be added together or one at a time, in any desired sequence. It is preferable, however, to add the antioxidant and alkaline inhibitor as a solution in the glycol alcohol ether component. All components are mixed until a single phase composition is obtained.

The following examples which illustrate various embodiments of this invention are to be considered not limitative.

EXAMPLE I

| | Percent by wt. |
|---|---|
| Adduct of nonyl phenol plus 4½ moles of ethylene oxide | 24.4 |
| Diethylene glycol | 37.3 |
| Ethylene glycol monomethyl ether | 20.4 |
| Diethylene glycol monomethyl ether | 12.9 |
| Triethylene glycol monomethyl ether | 4.0 |
| Potassium soap of rosin | 1.0 |
| | 100.0 |

EXAMPLE II

| | Percent by wt. |
|---|---|
| Adduct of nonyl phenol plus 4½ moles of ethylene oxide | 24.5 |
| Diethylene glycol | 9.8 |
| Diethylene glycol monomethyl ether | 13.75 |
| Triethylene glycol monomethyl ether | 51.25 |
| Glycol-Borax condensate[1] | 0.7 |
| | 100.00 |

[1] This product prepared by condensing 10.42 moles of ethylene glycol with 1.52 moles of potassium tetraborate.

EXAMPLE III

| | Percent by wt. |
|---|---|
| Adduct of nonyl phenol plus 3 moles ethylene oxide | 25.0 |
| Diethylene glycol monomethyl ether | 18.7 |
| Triethylene glycol monomethyl ether | 56.1 |
| Potassium tetraborate | 0.20 |
| | 100.0 |

EXAMPLE IV

| | Percent by wt. |
|---|---|
| Adduct of nonyl phenol plus 2 moles ethylene oxide | 25.0 |
| Diethylene glycol monomethyl ether | 18.75 |
| Triethylene glycol monomethyl ether | 56.05 |
| Potassium tetraborate | 0.20 |
| | 100.00 |

EXAMPLE V

| | Percent by wt. |
|---|---|
| Adduct of nonyl phenol plus 6.5 moles of a mixture of 50 percent by weight of ethylene oxide and 50 percent by weight of propylene oxide (random addition product)[1] | 20.0 |
| Diethylene glycol monomethyl ether | 20.0 |
| Triethylene glycol monomethyl ether | 59.8 |
| Potassium tetraborate | 0.2 |
| | 100.0 |

[1] The molecular weight of the mixture is calculated as 44+58÷2 or 51.

EXAMPLE VI

| | Percent by wt. |
|---|---|
| Adduct of octyl phenol plus 5 moles ethylene oxide | 20.0 |
| Diethylene glycol monomethyl ether | 20.0 |
| Triethylene glycol monomethyl ether | 59.8 |
| Potassium tetraborate | 0.2 |
| | 100.0 |

EXAMPLE VII

| | Percent by wt. |
|---|---|
| Nonyl phenol plus 4½ moles ethylene oxide | 35.4 |
| Diethylene glycol | 9.8 |
| Diethylene glycol monomethyl ether | 54.6 |
| Potassium tetraborate | 0.2 |
| | 100.0 |

EXAMPLE VIII

| | Percent by wt. |
|---|---|
| Nonyl phenol plus 13 moles of a mixture of 60 weight percent ethylene oxide and 40 weight percent propylene oxide (random addition product) | 11.20 |
| Nonyl phenol plus 4½ moles of ethylene oxide | 11.20 |
| Diethylene glycol | 9.80 |
| Ethylene glycol monomethyl ether | 7.70 |
| Diethylene glycol monomethyl ether | 56.85 |
| Dodecyl benzene | 1.50 |
| Water | 0.60 |
| Potassium tetraborate | 0.35 |
| Dibutylated 2,2-di-(4-hydroxyphenyl) propane | 0.30 |
| Butynediol | 0.50 |
| | 100.00 |

EXAMPLE IX

| | Percent by wt. |
|---|---|
| Nonyl phenol plus 13 moles of a mixture of 60 weight percent ethylene oxide and 40 weight percent propylene oxide (random addition product) | 12.25 |
| Nonyl phenol plus 4½ moles of ethylene oxide | 12.25 |
| Diethylene glycol | 9.80 |
| Ethylene glycol monomethyl ether | 4.50 |
| Diethylene glycol monomethyl ether | 58.55 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

EXAMPLE X

| | Percent by wt. |
|---|---|
| Nonyl phenol plus 13 moles of a mixture of 60 weight percent ethylene oxide and 40 weight percent propylene oxide (random addition product) | 10.50 |
| Nonyl phenol plus 4½ moles of ethylene oxide | 10.50 |
| Diethylene glycol | 43.00 |
| Ethylene glycol monomethyl ether | 19.00 |
| Diethylene glycol monomethyl ether | 14.35 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

EXAMPLE XI

| | Percent by wt. |
|---|---|
| Nonyl phenol plus 13 moles of a mixture of 60 weight percent ethylene oxide and 40 weight percent propylene oxide (random addition product) | 12.00 |
| Nonyl phenol plus 4½ moles of ethylene oxide | 12.00 |
| Diethylene glycol | 9.80 |
| Diethylene glycol monomethyl ether | 36.39 |
| Triethylene glycol monomethyl ether | 27.16 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

EXAMPLE XII

| | Percent by wt. |
|---|---|
| Nonyl phenol plus 13 moles of a mixture of 60 weight percent ethylene oxide and 40 weight percent propylene oxide (random addition product) | 11.75 |
| Nonyl phenol plus 4½ moles of ethylene oxide | 11.75 |
| Diethylene glycol | 4.00 |
| Diethylene glycol monomethyl ether | 10.83 |
| Triethylene glycol monomethyl ether | 50.02 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

The fluid compositions of Examples VIII–XII were tested according to the procedures set forth in Hydraulic Brake Fluid—SAE Standard J–70–B. Pertinent data relating to these tests, which illustrates the outstanding properties of these novel fluids, is shown in Table I. All of the fluids tested (i.e., the fluids of Examples VIII–XII) were found to satisfy completely the requirements for Heavy Duty 70R1 Type Hydraulic Brake Fluid.

EXAMPLES XIII–XL

In Table II, which follows, data relating to a wide variety of fluid compositions containing the novel lubricants of this invention which were prepared and tested (Examples XIII–XXXVI) for (a) rubber swelling, (b) evaporation residue, (c) viscosity characteristics and (d) fluidity and appearance at −40° F. (cold test) are presented. These tests were conducted according to the procedure described in Hydraulic Brake Fluid Standard SAE–J–70–B.

Examples XXXVII, XXXVIII, XXXIX and XL which are shown for comparative purposes are examples of fluids containing lubricants widely used in the art. The fluids of these examples do not form a part of this invention. Data shown in Table II clearly indicates the outstanding superiority of lubricants and fluids of this invention, especially with regard to evaporation residue, when compared to the properties of the commonly used lubricants of the art utilized in Examples XXXVII, XXXVIII, XXXIX and XL. The low evaporation residue values reported for these four last-mentioned fluids indicates the lack of stability of these compositions.

TABLE I.—TESTING OF HYDRAULIC BRAKE FLUID COMPOSITIONS

[Test conducted according to procedures set forth in Society of Automotive Engineers Standard J-70-B]

| Test | SAE 70R Requirement | Example Number VIII | IX | X | XI | XII |
|---|---|---|---|---|---|---|
| Boiling Point, °F | 302° F. min | 319 | 350 | 320 | 398 | 428 |
| Flash Point, °F | 145.4° F. min | 195 | 195 | 180 | 220 | 225 |
| Viscosity, c.s.: | | | | | | |
| −40° F | 1,800 cs. max | 465 | 542 | 1,529 | 1,035 | 1,370 |
| +122° F | 3.5 cs. min | 4.1 | 4.7 | 6.7 | 5.73 | 6.23 |
| +212° F | 1.3 cs. min | 1.7 | 1.8 | 2.3 | 2.12 | 2.26 |
| pH | 7.0–11.5 | 9.8 | 10.1 | 11.0 | 11.3 | 11.4 |
| Stability at High Temperature: | | | | | | |
| Boiling Point, °F | 294.8° F. min | 326 | 354 | 323 | 398 | 430 |
| Boiling Point Change, °F | ±9° F. max | +7 | +4 | +3 | 0 | +2 |
| Corrosion weight change, mg./sq. cm.: | | | | | | |
| Tinned Iron | 0.2 max | 0.0 | 0.0 | 0.0 | 0.0 | 0.0 |
| Steel | 0.2 max | 0.0 | 0.0 | 0.0 | 0.0 | 0.0 |
| Aluminum | 0.1 max | 0.0 | 0.0 | 0.0 | 0.0 | 0.0 |
| Cast Iron | 0.2 max | 0.0 | +0.05 | 0.0 | 0.0 | 0.0 |
| Brass | 0.4 max | 0.0 | 0.0 | −0.06 | 0.0 | 0.0 |
| Copper | 0.4 max | 0.0 | −0.05 | −0.06 | −0.08 | 0.0 |
| Pitting or roughening of metal strips | None | None | None | None | None | None |
| Jelling of fluid-water mixture | do | None | None | None | None | None |
| Crystalline deposit on glass jar walls or metal strips | do | None | None | None | None | None |
| Sedimentation, percent by volume | 0.10 percent max | <0.1 | <0.1 | <0.1 | <0.05 | <0.05 |
| pH fluid-water mixture | 7.0–11.5 | 9.5 | 9.6 | 7.3 | 10.9 | 11.0 |
| Disintegration rubber cups evidenced by excessive tackiness or blisters | None | None | None | None | None | None |
| Sloughing rubber cups evidenced by carbon black separation | do | None | None | None | None | None |
| Decrease hardness rubber cups | 15 deg. max | −4 | −5 | −6 | −5 | −6 |
| Increase base diameter rubber cups, in | 0.055″ max | 0.033 | 0.033 | 0.053 | 0.031 | 0.029 |
| Fluidity and Appearance Low Temperatures: | | | | | | |
| −40° F.: | | | | | | |
| Discernibility black contrast lines | Clearly discernible | Clear | Clear | Clear | Clear | Clear |
| Stratification or sedimentation | None | None | None | None | None | None |
| Time air bubble travel to top, sec | 10 sec. max | 2 | 2 | 3 | 2 | 2 |
| −58° F.: | | | | | | |
| Discernibility black contrast lines | Clearly discernible | Clear | Clear | Clear | Clear | Clear |
| Stratification or sedimentation | None | None | None | None | None | None |
| Time air bubble travel to top, sec | 35 sec. max | 2 | 2 | 4 | 3 | 4 |
| Evaporation: | | | | | | |
| Percent Weight Loss | 80 percent max | 77.2 | 74.2 | 78.5 | 75.0 | 74.5 |
| Gritty or abrasive ppt. in residue | None | None | None | None | None | None |
| Pour point residue, °F | 23° F. max | 5 | 5 | 5 | −5 | −5 |
| Water Tolerance: | | | | | | |
| −40° F.: | | | | | | |
| Discernibility black contrast lines | Clearly discernible | Clear | Clear | Clear | Clear | Clear |
| Stratification or sedimentation | None | None | None | None | None | None |
| Time air bubble travel to top, sec | 10 sec. max | 2 | 2 | 3 | 1 | 2 |
| +140° F.: | | | | | | |
| Stratification | None | None | None | None | None | None |
| Sedimentation, percent | 0.05 percent by vol. max | None | None | None | 0.00 | 0.00 |
| Compatibility: | | | | | | |
| −40° F.: | | | | | | |
| Discernibility black contrast lines | Clearly discernible | Clear | Clear | Clear | Clear | Clear |
| Stratification or sedimentation | None | None | None | None | None | None |
| +140° F.: | | | | | | |
| Stratification | do | None | None | None | None | None |
| Sedimentation, percent | 0.05 percent by volume max | None | None | None | None | None |
| Resistance to Oxidation: | | | | | | |
| Pitting or roughening metal strips | None | None | None | None | None | None |
| Gum deposit metal strips | Trace | None | None | None | None | None |
| Weight loss, mg./sq. cm.: | | | | | | |
| Aluminum | 0.05 max | 0.00 | 0.00 | 0.01 | +0.01 | +0.01 |
| Cast Iron | 0.30 max | 0.01 | 0.01 | 0.00 | +0.01 | +0.02 |
| Effect on Rubber, +155° F.: | | | | | | |
| Hardness decrease: | | | | | | |
| Natural | 10 deg. max | 4 | 4 | 3 | 4 | 5 |
| SBR | 10 deg. max | 3 | 4 | 4 | 4 | 5 |
| Base diameter increase, in.: | | | | | | |
| Natural | 0.006–0.055″ | 0.029 | 0.029 | 0.036 | 0.027 | 0.023 |
| SBR | 0.006–0.055″ | 0.024 | 0.026 | 0.024 | 0.022 | 0.024 |
| Disintegration evidenced by excessive tackiness or blisters: | | | | | | |
| Natural | None | None | None | None | None | None |
| SBR | do | None | None | None | None | None |
| Sloughing indicated by carbon black separation: | | | | | | |
| Natural | do | None | None | None | None | None |
| SBR | do | None | None | None | None | None |
| Specific Gravity, 60/60° F | No requirement | 1.036 | 1.038 | 1.060 | 1.048 | 1.05 |
| Pounds per gallon, 60° F | do | 8.63 | 8.65 | 8.83 | 8.73 | 8.77 |

TABLE II.—HYDRAULIC FLUID COMPOSITIONS

[All fluids contain 20 percent by weight of lubricant compositions, 20 percent by weight of diethylene glycol monomethyl ether, and 80 percent by weight of triethylene glycol monomethyl ether]

| Example | Lubricant Composition | Calculated Molecular Weight | Rubber Swelling (Milli-inches) Natural Rubber (120 hours at 158° F.) | Styrene Butadiene Rubber (120 hours at 158° F.) | Styrene Butadiene Rubber (70 hours at 248° F.) | Evaporation Residue Weight Percent (96 hrs. at 212° F.) | Kinematic Viscosity (Centistokes) 212° F. | 122° F. | −40° F. | Cold Test (−40° F.) |
|---|---|---|---|---|---|---|---|---|---|---|
| XIII | Nonyl phenol plus 2 moles ethylene oxide | 308 | 31 | 33 | 55 | 18.9 | | | | Pass |
| XIV | Nonyl phenol plus 3 moles ethylene oxide | 352 | 28 | 27 | 53 | 18.8 | | | | Pass |
| XV | Nonyl phenol plus 4.5 moles ethylene oxide | 418 | 19 | 16 | 40 | 20.0 | 1.70 | 4.2 | 568 | Pass |
| XVI | Nonyl phenol plus 5.0 moles ethylene oxide | 440 | 20 | 22 | 28 | 20.1 | 1.70 | 4.34 | 528 | Pass |
| XVII | Nonyl phenol plus 5.5 moles ethylene oxide | 462 | 17 | 18 | 30 | 20.0 | 1.72 | 4.34 | 543 | Pass |
| XVIII | Nonyl phenol plus 6.5 moles of a mixture of 50 weight percent ethylene oxide | 545 | 22 | 23 | 38 | 20.0 | 1.74 | 4.4 | 542 | Pass |
| XIX | Nonyl phenol plus 8.0 moles of a mixture of 50 weight percent ethylene oxide (random adduct) | 620 | 20 | 21 | 31 | 20.2 | 1.79 | 4.5 | 532 | Pass |
| XX | Nonyl phenol plus 9.5 moles of mixture of 50 weight percent ethylene oxide (random adduct) | 705 | 18 | 20 | 27 | 20 | 1.82 | 4.6 | 539 | Pass |
| XXI | Para-tertiary butyl phenol plus 9.5 moles of a mixture of 50 weight percent propylene oxide, and 50 weight percent propylene oxide | 636 | 13 | 15 | 23 | 16.5 | 1.8 | 4.5 | 525 | Pass |
| XXII | Mixed cresols plus 9.5 moles of a mixture of 50 weight percent ethylene oxide and 50 weight percent propylene oxide (random adduct) | 594 | 12 | 11 | 24 | 16.6 | | | | Pass |
| XXIII | Nonyl phenol and 19 moles of a mixture of 50 percent by weight of ethylene oxide and 50 percent of propylene oxide (random adduct) | 1,190 | 12 | 12 | 25 | 19.1 | | | | Pass |
| XXIV | Naphthol plus 9.5 moles of a mixture of 50 weight percent of propylene oxide (random adduct) | 629 | 13 | 8 | 24 | 16.6 | | | | Pass |
| XXV | Nonyl phenol plus 40 moles of a mixture of a 50 weight percent of ethylene oxide and 50 percent of propylene oxide (random addition product) | 2,260 | 10 | 9 | 16 | 17.4 | | | | Pass |
| XXVI | Nonyl phenol plus 2 moles propylene oxide | 336 | 37 | 37 | 66 | 19.4 | | | | Pass |
| XXVII | Dodecyl phenol plus 2 moles ethylene oxide | 350 | 29 | 20 | 50 | 20.3 | | | | Pass |
| XXVIII | Dodecyl phenol plus 5 moles ethylene oxide | 482 | 19 | 18 | 35 | 20.4 | | | | Pass |
| XXIX | Nonyl phenol plus 19 moles propylene oxide | 1,322 | 19 | 18 | | 18.1 | | | | Pass |
| XXX | Dinonyl phenol plus 9.5 moles of mixture of 50 weight percent ethylene oxide and 50 weight percent propylene oxide (random addition product) | 832 | 31 | 23 | 39 | 20 | | | | Pass |
| XXXI | Tertiary butyl catechol plus 9.5 moles of a mixture of 50 weight percent of ethylene oxide and 50 weight percent ethylene oxide and 50 weight percent propylene oxide (random addition product) | 652 | 11 | 5 | 14 | 19.8 | | | | Pass |
| XXXII | Resorcinol plus 9.5 moles of a mixture of 50 weight percent ethylene oxide and 50 weight percent propylene oxide (random addition product) | 595 | 9 | 5 | 14 | 19.8 | | | | Pass |
| XXXIII | Pyrogallol plus 9.5 moles of a mixture of 50 weight percent of ethylene oxide and 50 weight percent of propylene oxide (random addition product) | 639 | | | | 19.1 | | | | Pass |
| XXXIV | Nonyl phenol plus 2 moles butylene oxide | 364 | | | | 18.5 | | | | Pass |
| XXXV | Nonyl phenol plus 9.5 moles butylene oxide | 771 | | | | 19.7 | | | | Pass |
| XXXVI | Nonyl phenol plus 9.5 moles of a mixture of 50 weight percent of butylene oxide and 50 weight percent of ethylene oxide and 50 weight percent propylene oxide (random addition product) | 992 | 10 | 7 | 20 | 8 | | | | Pass |
| XXXVII | Butanol plus 18 moles of a mixture of 50 weight percent ethylene oxide and 50 weight percent propylene oxide | 1,990 | 11 | 7 | 16 | 6 | | | | Pass |
| XXXVIII | Water plus 34 moles of a mixture of 50 weight percent of ethylene oxide and 50 weight percent of propylene oxide (random addition product) | 2,540 | 8 | 5 | 17 | 13 | | | | Pass |
| XXXIX | Glycerine plus 48 moles of a mixture of 50 weight percent of ethylene oxide and 50 weight percent of propylene oxide (random addition product) | | | | | | | | | Pass |
| XL | Water plus 23 moles of a mixture of ethylene oxide and 50 weight percent of propylene oxide (random addition product) | 1,191 | 11 | 6 | 15 | 12 | | | | Pass |

What is claimed is:
1. A hydraulic fluid composition consisting essentially of from about 20 to about 50 percent by weight, based on the total weight of the fluid composition, of at least one lubricant selected from the group consisting of (A) a compound of the formula:

[structure: benzene ring with substituents $R^d$, $R^c$, $R^b$, $R^a$]

wherein $R^a$ is selected from the group consisting of (a) $(OC_nH_{2n})_zOH$, in which $n$ is an integer of from 2 to 4 inclusive, $z$ is an integer of from 1 to 25 and with the proviso that when $n$ is 2 then $z$ is 1 to 5 inclusive and (b) a heteric polymeric chain of oxyethylene units and oxyalkylene units derived from an alkylene oxide selected from the group consisting of propylene oxide and butylene oxide, the said chain being terminated by a free hydroxyl group, wherein the said chain contains a total of not more than 40 oxyalkylene units and in the said chain the weight percent of oxyethylene units, based on the total weight of all the oxyalkylene units in the entire chain, is from 5 to 65; $R^b$ is selected from the group consisting of (a) hydrogen and (b) alkyl of from 1 to 20 carbon atoms, $R^c$ is selected from the group consisting of (a) hydrogen, (b) alkyl of from 1 to 20 carbon atoms, (c) $(OC_nH_{2n})_zOH$, wherein $n$ and $z$ have the same meaning as previously described and (d) a heteric polymeric chain of oxyethylene units and oxyalkylene units derived from an alkylene oxide selected from the group consisting of propylene oxide and butylene oxide, the said chain being terminated by a free hydroxyl group, wherein the said chain contains a total of not more than 40 oxyalkylene units and in the said chain the weight percent of oxyethylene units, based on the total weight of all of the oxyalkylene units in the entire chain, is from about 5 to about 65, $R^d$ is selected from the group consisting of (a) hydrogen, (b)

$$(OC_nH_{2n})_zOH$$

wherein $n$ and $z$ have same meaning as previously described, and (c) a heteric polymeric chain of oxyethylene units and oxyalkylene units derived from an alkylene oxide selected from the group consisting of propylene oxide and butylene oxide, the said chain being terminated by a free hydroxyl group, wherein the said chain contains a total of not more than 40 oxyalkylene units and in the said chain the weight percent of oxyethylene units, based on the total weight of all of the oxyalkylene units in the entire chain, is from about 5 to about 65, and (B) a compound of the formula:

[structure: naphthalene with $-R^a$]

wherein $R^a$ has the same meaning as previously described; and from about 50 to about 80 percent by weight based on the total weight of the fluid composition of at least one diluent selected from the group consisting of (a) a glycol of the formula:

$$HO(R^eO)_pH$$

wherein $R^e$ is alkylene of from 2 to 3 inclusive carbon atoms, and $p$ is an integer of from 1 to 3 inclusive and (b) a glycol alcohol ether of the formula:

$$R^fO(R^gO)_mH$$

wherein $R^f$ is alkyl of from 1 to 6 carbon atoms, $R^g$ is alkylene of from 2 to 3 inclusive and $m$ is an integer of from 1 to 4 inclusive.

2. The hydraulic fluid composition of claim 1 wherein the said lubricant is:

[structure: benzene ring with $C_9H_{19}$ and $-R^a$]

wherein $R^a$ is a heteric polymeric chain of oxyethylene and oxypropylene units, the said chain being terminated by a free hydroxyl group, wherein the said chain contains an average of 10 oxyalkylene units and wherein the weight percent of oxyethylene units based on the weight of all of the oxyalkylene units in the entire chain is 50.

3. The hydraulic fluid composition of claim 1 wherein the said diluent is triethylene glycol monomethyl ether.

4. A hydraulic fluid composition comprising from about 20 to about 50 percent by weight, based on the total weight of the fluid composition, of at least one lubricant selected from the group consisting of (A) a compound of the formula:

[structure: benzene ring with substituents $R^d$, $R^c$, $R^b$, $R^a$]

wherein $R^a$ is selected from the group consisting of (a) $(OC_nH_{2n})_zOH$, in which $n$ is an integer of from 2 to 4 inclusive, $z$ is an integer of from 1 to 25 and with the proviso that when $n$ is 2 then $z$ is 1 to 5 inclusive and (b) a heteric polymeric chain of oxyethylene units and oxyalkylene units derived from an alkylene oxide selected from the group consisting of propylene oxide and butylene oxide, the said chain being terminated by a free hydroxyl group, wherein the said chain contains a total of not more than 40 oxyalkylene units and in the said chain the weight percent of oxyethylene units, based on the total weight of all the oxyalkylene units in the entire chain is from 5 to 65; $R^b$ is selected from the group consisting of (a) hydrogen and (b) alkyl of from 1 to 20 carbon atoms, $R^c$ is selected from the group consisting of (a) hydrogen, (b) alkyl of from 1 to 20 carbon atoms, (c) $(OC_nH_{2n})_zOH$, wherein $n$ and $z$ have the same meaning as previously described and (d) a heteric polymeric chain of oxyethylene units and oxyalkylene units derived from an alkylene oxide selected from the group consisting of propylene oxide and butylene oxide, the said chain bein gterminated by a free hydroxyl group, wherein the said chain contains a total of not more than 40 oxyalkylene units and in the said chain the weight percent of oxyethylene units, based on the total weight of all of the oxyalkylene units in the entire chain, is from about 5 to about 65, $R^d$ is selected from the group consisting of (a) hydrogen, (b) $(OC_nH_{2n})_zOH$, wherein $n$ and $z$ have same meaning as previously described, and (c) a heteric polymeric chain of oxyethylene units and oxyalkylene units derived from an alkylene oxide selected from the group consisting of propylene oxide and butylene oxide the said chain being terminated by a free hydroxyl group, wherein the said chain contains a total of not more than 40 oxyalkylene units and in the said chain the weight percent of oxyethylene units, based on the total weight of all of the oxyalkylene units in the entire chain, is from about 5 to about 65, and (B) a compound of the formula:

[structure: naphthalene with $-R^a$]

wherein $R^a$ has the same meaning as previously described; from about 50 to about 80 percent by weight based on the total weight of the fluid composition of at least one diluent selected from the group consisting of (a) a glycol of the formula:

$$HO(R^eO)_pH$$

wherein $R^e$ is alkylene of from 2 to 3 carbon atoms, and $p$ is an integer of from 1 to 3 inclusive, (b) a glycol alcohol ether of the formula:

$$R^fO(R^gO)_mH$$

wherein $R^f$ is alkyl of from 1 to 6 carbon atoms, $R^g$ is alkylene of from 2 to 3 inclusive carbon atoms and $m$ is an integer of from 1 to 4 inclusive; from about 0.1 to about 1.5 percent by weight, based on the total weight of the fluid composition of an alkaline inhibitor selected from the group consisting of an alkali metal borate, an alkali metal salt of a higher fatty acid, morpholine, phenyl morpholine, ethanolamine, diethanolamine, monobutyl ammonium borate, dibutyl ammonium borate, dibutyl amine phosphate and lower alkylene glycol condensate of an alkali metal borate; from about 0.001 to about 1.5 percent by weight, based on the total weight of the fluid composition of an antioxidant selected from the group consisting of 2,2-di-(4-hydroxyphenyl) propane, phenothiazine, polymerized dimethyl dihydroquinoline, phenyl alpha-naphthylamine, phenyl-beta-naphthylamine, dioctyl diphenylamine, dibutyl cresol, dibutylated 2,2-di(4-hydroxyphenyl) propane, N-butylated aminophenol and butylated hydroxyanisole; from about 0.1 to about 1.0 percent by weight, based on the total weight of the fluid composition, of butynediol; from about 0.1 to 3.0 percent by weight, based on the total weight of the fluid composition, of dodecyl benzene, and from about 0.1 to about 2.0 percent by weight, based on the total weight of the fluid composition, of water.

5. The hydraulic fluid composition of claim 4 wherein the said lubricant comprises equal parts by weight of (A) the compound:

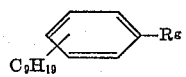

wherein $R^g$ is a heteric polymeric chain of oxyethylene units and oxypropylene units, the said chain being terminated by a free hydroxyl group, wherein the said chain contains an average of 13 oxyalkylene units and wherein the weight percent of oxyethylene units based on the total weight of all the oxyalkylene units in the entire chain is 60; and (B) the compound:

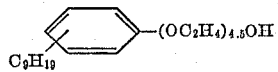

6. The hydraulic fluid composition of claim 4, the said diluent comprises, in combination, diethylene glycol, ethylene glycol monomethyl ether and diethylene glycol monomethyl ether.

7. The hydraulic fluid composition of claim 4 wherein the said alkaline inhibitor is potassium tetraborate.

8. The hydraulic fluid composition of claim 4 wherein the said antioxidant is dibutylated 2,2-di-(4-hydroxyphenyl) propane.

9. A hydraulic fluid composition consisting essentially of the following ingredients in the approximate percentage by weight indicated:

| | Percent by wt. |
|---|---|
| Nonyl phenol plus 13 moles of a mixture of 60 weight percent ethylene oxide and 40 weight percent propylene oxide (random addition product | 11.20 |
| Nonyl phenol plus 4½ moles of ethylene oxide | 11.20 |
| Diethylene glycol | 9.80 |
| Ethylene glycol monomethyl ether | 7.70 |
| Diethylene glycol monomethyl ether | 56.85 |
| Dodecyl benzene | 1.50 |
| Water | 0.60 |
| Potassium tetraborate | 0.35 |
| Dibutylated 2,2-di-(4-hydroxyphenyl) propane | 0.30 |
| Butynediol | 0.50 |
| | 100.00 |

10. A hydraulic fluid composition consisting essentially of the following ingredients in the approximate percentage by weight indicated:

| | Percent by wt. |
|---|---|
| Nonyl phenol plus 13 moles of a mixture of 60 weight percent ethylene oxide and 40 weight percent propylene oxide (random addition product) | 12.25 |
| Nonyl phenol plus 4½ moles of ethylene oxide | 12.25 |
| Diethylene glycol | 9.80 |
| Ethylene glycol monomethyl ether | 4.50 |
| Diethylene glycol monomethyl ether | 58.55 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

11. A hydraulic fluid composition consisting essentially of the following ingredients in the approximate percentage by weight indicated:

| | Percent by wt. |
|---|---|
| Nonyl phenol plus 13 moles of a mixture of 60 weight percent ethylene oxide and 40 weight percent propylene oxide (random addition product) | 10.50 |
| Nonyl phenol plus 4½ moles of ethylene oxide | 10.50 |
| Diethylene glycol | 43.00 |
| Ethylene glycol monomethyl ether | 19.00 |
| Diethylene glycol monomethyl ether | 14.35 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

12. A hydraulic fluid composition consisting essentially of the following ingredients in the approximate percentage by weight indicated:

| | Percent by wt. |
|---|---|
| Nonyl phenol plus 13 moles of a mixture of 60 weight percent ethylene oxide and 40 weight percent propylene oxide (random addition product) | 12.00 |
| Nonyl phenol plus 4½ moles of ethylene oxide | 12.00 |
| Diethylene glycol | 9.80 |
| Diethylene glycol monomethyl ether | 36.39 |
| Triethylene glycol monomethyl ether | 27.16 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

13. A hydraulic fluid composition consisting essentially of the following ingredients in the approximate percentage by weight indicated:

| | Percent by wt. |
|---|---|
| Nonyl phenol plus 13 moles of a mixture of 60 weight percent ethylene oxide and 40 weight percent propylene oxide (random addition product) | 11.75 |
| Nonyl phenol plus 4½ moles of ethylene oxide | 11.75 |
| Diethylene glycol | 4.00 |
| Diethylene glycol monomethyl ether | 10.83 |
| Triethylene glycol monomethyl ether | 59.02 |
| Dodecyl benzene | 1.50 |
| Potassium tetraborate | 0.35 |
| Dibutylated 2,2-di-(4-hydroxyphenyl) propane | 0.30 |
| Butynediol | 0.50 |
| | 100.00 |

(References on following page)

References Cited

UNITED STATES PATENTS

| | | | |
|---|---|---|---|
| 2,657,181 | 10/1953 | Van Horn et al. | 252—73 |
| 2,723,294 | 11/1955 | Benoit | 260—615 |
| 3,115,463 | 12/1963 | Orloff et al. | 252—404 X |
| 3,185,735 | 5/1965 | Leis et al. | 260—615 |
| 3,240,708 | 3/1966 | Dulat et al. | 252—389 |

OTHER REFERENCES

Rose: Condensed Chemical Dictionary, N.Y., Reinhold, 1956, p. 190.

MURRAY KATZ, *Primary Examiner.*

LEON D. ROSDOL, *Examiner.*

S. D. SCHWARTZ, *Assistant Examiner.*